UNITED STATES PATENT OFFICE.

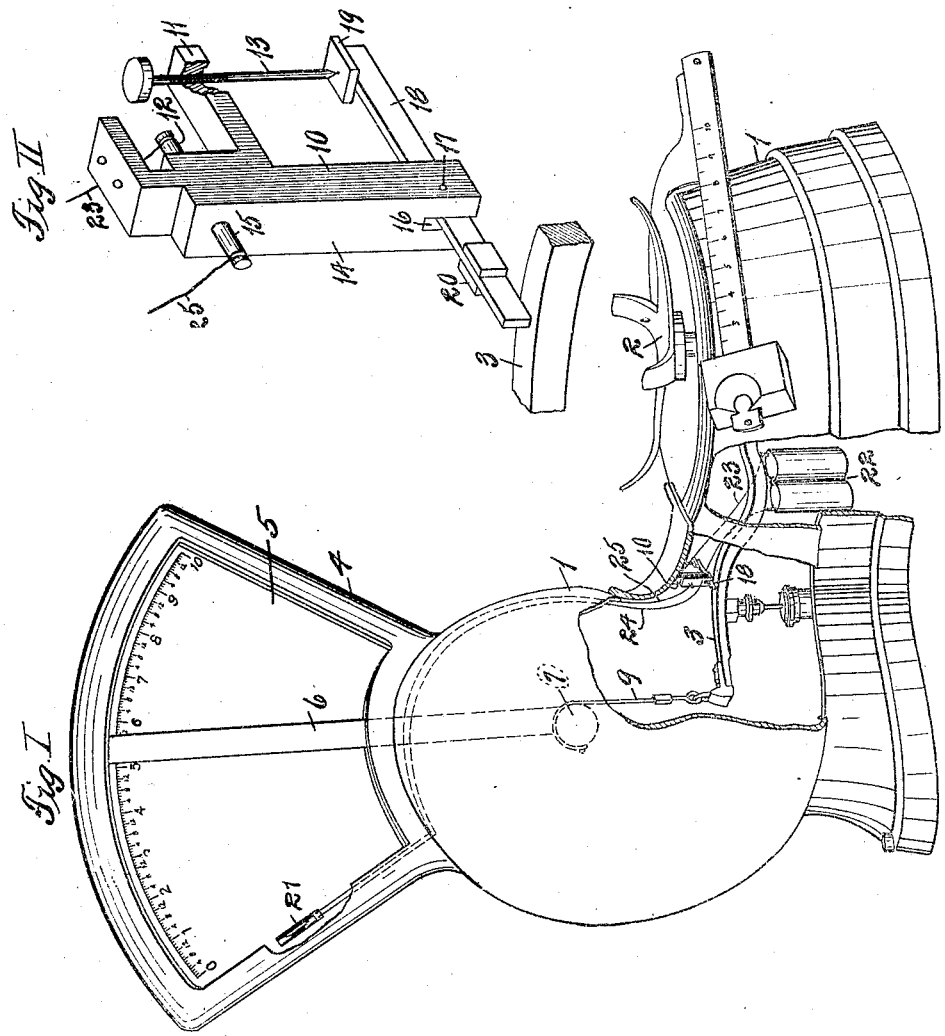

HARRY H. BANE AND SAMUEL G. CRANE, OF KANSAS CITY, MISSOURI, ASSIGNORS, BY DIRECT AND MESNE ASSIGNMENTS, OF ONE-THIRD TO HENRY B. PRUDEN, ONE-THIRD TO EARL R. LINES, AND ONE-THIRD TO CHARLES B. LONGSTRETH, ALL OF DAYTON, OHIO.

ILLUMINATING APPARATUS FOR SCALES.

937,573. Specification of Letters Patent. Patented Oct. 19, 1909.

Application filed June 12, 1908. Serial No. 438,079.

*To all whom it may concern:*

Be it known that we, HARRY H. BANE and SAMUEL G. CRANE, both citizens of the United States, residing at Kansas City, in the county of Jackson and State of Missouri, have invented certain new and useful Improvements in Illuminating Apparatus for Scales; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to an illuminating device for scales, and more particularly to a device adapted for use with computing scales; the object of our invention being to provide means for automatically illuminating the scale chart or beam at each operation of the scale.

A further object of our invention is to secure such illumination in such manner as to minimize the possibility of affecting the operation or accuracy of the scale.

In accomplishing these objects, we have provided the improved details of structure which will presently be fully described and pointed out in the following claims; reference being had to the accompanying drawings in which:—

Figure I is a perspective view of a scale equipped with an illuminating device constructed according to our invention, a portion of the scale being broken away to illustrate our improvements and the portion of the scale mechanism with which the illuminating parts are connected. Fig. II is an enlarged detail view, in perspective, of the contact mechanism. Fig. III is a circuit diagram.

In the accompanying drawings, we have not fully illustrated the scale parts for the reason that they are well known and form no part of our invention, the parts that are shown being intended merely for the purpose of illustrating our improved illuminating device.

In computing scales in particular, it has heretofore been difficult to secure a proper reading of the computation chart, owing to the small figures contained thereon and the fact that often these scales are located in such places as not to afford adequate light to assist in the reading operation. This disadvantage has been attempted to be remedied by the use of reflecting mirrors to throw light on the reading portions of the chart. The present invention is designed to remedy these previous difficulties. It dispenses with the use of any such mirrors and gives an illumination on the chart which is automatically arranged so as to light up the chart at each operation of the scale, and at the same time to preserve simplicity and accuracy; also to facilitate the assembling and adjusting of the parts and securing other desiderata peculiar to machines of this sort.

Referring more in detail to the parts:—1 designates the scale base and frame upon which a platform 2 is supported by means of a lever mechanism, the arm of which is designated by the numeral 3.

4 designates a chart frame within which is located a chart card 5 that may bear the usual weight and price graduations used with any type of computing scale.

6 designates a pendulum having a pivoted hub 7, the upper end of the pendulum being adapted for movement over the chart and the hub being connected with the free end of the scale lever by a ribbon 9.

10 designates a bracket that is preferably attached to the inner surface of the scale frame adjacent to the lever arm 3. Attached to and projecting laterally from bracket 10 is an arm 11 of conductive material; such arm being provided with a binding post 12 and with a threaded perforation, through which a threaded pin 13 is adjustably projected. Also carried by bracket 10 is a plate 14, which carries a binding post 15 and has a slot 16 in its lower end; the plate 14 being insulated from the arm 11, preferably by constructing the bracket 10 of non-conductive material. Pivoted within the slot 16 in plate 14 by means of a pin 17 is a beam 18, of conductive material, one arm of which is extended to a point beneath the pin 13 and is there preferably provided with a contact plate 19, while its opposite end is extended over the lever arm 3 and carries a weight 20 adapted to depress that end of the beam and insure a contact of the plate 19 and pin 13 under the conditions presently set forth.

21 designates a suitable lamp that is located in position for illuminating the chart card and scale plate; such lamp being preferably of an incandescent type and so connected with the contact mechanism and a source of electrical supply that the circuit through the lamp may be opened and closed by the operation of such mechanism, the preferred connection comprising a battery 22 that is located in the scale frame and has one of its poles connected by a wire 23 with one of the binding posts of the contact mechanism and the other with a lamp by a wire 24, the second post in the mechanism being connected with the lamp by a wire 25.

In using a device of this character, the contact and illuminating parts are applied to the scale mechanism, which may be of any ordinary type, either computing, floor, platform, etc., so that the lamp will illuminate the beam or chart and the scale lever will engage and slightly lift the weighted end of the beam 20 when the lever returns to normal after a weighing operation. When the parts are so arranged and the scale in balance, the pendulum end of the scale lever will engage the weighted end of the beam 18, rocking that end upwardly and the opposite end downwardly so that the plate 19 will be moved out of contact with the pin 13 to break the circuit through the parts connecting with the battery and lamp. When, however, it is desired to use the scales, an article is placed on the platform 2, which rocks the scale lever 3 so that its free end is moved downwardly away from the beam 18. The weighted end of the beam, being relieved of the support of the scale lever is rocked downwardly, elevating the plate end until the plate 19 is brought into contact with the point of pin 13, when a circuit is closed from battery 22 through wire 23, lamp 21, wire 25, post 15, plate 14, pin 17, beam 18, plate 19, pin 13, bracket 11, post 12, and wire 24, and the lamp 21 lighted to illuminate the scale chart or beam. As soon as the weight is removed from the scale platform the lever arm 3 will again rise into engagement with and rock the beam 18, separating the pin and plate contacts, and breaking the circuit, so that the light from the lamp is extinguished; the parts remaining in this normal condition ready for a succeeding operation.

It can readily be seen that when the parts are properly adjusted a very slight pressure is sufficient to rock the contact beam, as such action does not vary for different loads of the scale. It can also readily be seen that the action of the contact mechanism can not in any way interfere with the correct operation of the scale, as the contact beam is rocked of its own weight as the scale lever moves away from it, and, being held at the end opposite the scale lever by the pin 13, does not touch the lever while the latter is in actual operation.

While we show a battery as the source from which the lighting energy is taken it is readily apparent that the lamp and contact mechanism may be connected with a general lighting circuit.

As just above pointed out, when the scale is operated by placing some article upon the scale platform, the scale lever 3 moves downward away from the contact beam 18 and permits the latter to assume its normal contact-making position resting against the pin 13 to close the circuit and light the lamp. This construction of the switch is therefore such as to permit the continued movement of the scale lever independently of the contact device, so that there is no interference with the action of the scale in connection with the making of the electric circuit. It is therefore apparent that the contact beam 18 is allowed to strike the contact set screw or pin 13 and thereby cause lighting of the lamp at a certain point of displacement of the scale lever 3 downward from normal position. The said contact is made in this form of a threaded pin or set screw in order to permit the end of the pin to be raised or lowered and thereby vary the relation between the beam 18 and the pin 13 so as to vary the point at which the lighting circuit is made or broken. This adjustment by changing the position of the contact 13 thereby causes the scale lever 3 to control the movable contact beam 18 over a greater or less extent of the movement of the scale lever 3. That is, the parts are so organized that the scale lever controls the contact device, but becomes free therefrom at a certain point, and this particular adjustability of the contact device is so arranged as to vary the point referred to and thus control the range of movement in excess of which the scale lever becomes free from the contact device. The result of this construction is that the scale may be adjusted to cause the illumination to occur at any desired point of displacement of the scale lever downward. If desired the adjustment may be made so that a small oscillation of the scale lever in the vicinity of its normal position of rest, will not light and extinguish the lamp. Or the adjustment may be such as to cause the lighting to take place upon a very small increment of movement away from normal position. Likewise this permits adjustment of the contact device in connection with first setting up the scale for use so as to cause the lighting to take place properly timed in connection with the initial regulating of the parts to set the scale lever at its zero position before the scale is put in use for weighing.

Other forms of switch and of lighting means might be utilized for automatically controlling the lamp circuit by the scale lever; and although there are certain material advantages which arise from the location of this switch as connected with and controlled directly by the oscillating scale lever, yet other movable elements of the scale might be utilized to control automatically the illumination of the lamp.

The contact-device herein shown is connected with the movable element for only a short range of movement of the latter, being disconnected therefrom for a greater part of the movement. Therefore the scale lever does not have to do any work in positively moving the contact device into contact-making position. It simply holds the contact device out of normal contact-making position during the small extent of movement in the vicinity of the zero position of the scale lever.

Having thus described our invention, what we claim as new therein and desire to secure by Letters Patent is:—

1. In an illuminating apparatus for scales, the combination with a scale lever adapted for vertical rocking movement, of circuit making and breaking parts comprising a conductor plate, a conductor arm insulated from said plate, a conductor pin carried by said arm and adapted for adjustment therein, a conductor beam pivoted to said plate with one end projecting into the path of said scale lever and at one end adapted for engagement with said pin, a lamp, a source of electrical supply, and means for separately connecting the conductor plate and arm with the lamp and source of electrical supply.

2. The combination with a scale frame and rocking lever, of an insulating bracket suspended from said frame, a conductor plate carried by said bracket and provided with a transverse groove at one end, a conductor arm mounted on said bracket and insulated thereby from said plate, a conductor pin adjustably mounted in and projecting from said arm, a conductor beam pivoted in the groove in said plate and having one end projected over said scale lever and the opposite end projected beneath said pin, a contact plate on said beam adapted for engagement with said pin, a lamp, a source of electrical supply, a binding post on said plate and said arm, and means for connecting the lamp and electrical supply with said binding posts, substantially as and for the purpose set forth.

3. In an illuminating apparatus for scales, the combination with a scale lever, adapted for vertical rocking movement, of circuit making and breaking parts comprising a conductor plate, a conductor arm insulated from said plate, a conductor pin carried by said arm, and adapted for adjustment therein, a conductor beam pivoted to said plate projecting into the path of said scale lever and at one end adapted for engagement with said pin, a lamp, a source of electrical supply, and means for separately connecting the conductor plate and arm with the lamp and source of electrical supply.

4. In an illuminating device for scales, the combination with the weighing elements of the scale, of an illuminating lamp; and means controlled by one of the movable members of the scale for automatically lighting the lamp, said means being constructed to light the lamp immediately upon the movement of said scale member from normal position and also constructed to remain out of contact with the scale member over its entire weighing range of movement.

5. In an illuminating device for computing scales, the combination with the weighing elements of the scale, and a computation indicating chart coöperating therewith, of an illuminating lamp; a normally open switch for controlling the illumination of said lamp; and connections controlled by one of the movable members of the scale for operating said switch, said switch and connections being constructed to close the switch immediately upon the movement of said scale member from normal zero position and to maintain it closed over the entire weighing range of movement of the scale member, but to open the switch when said scale member is at normal zero position or beyond its range of weighing positions.

6. An illuminating device for computing scales comprising the combination of the weighing elements of the scale, computation indicating elements including a computation chart and coöperating with connections to said weighing elements for indicating the various computation values according to the various weights; an electric lamp positioned in immediate proximity to said chart and arranged to illuminate the said indications thereon; a normally open electric circuit for said lamp; and means automatically actuated by one of the movable members of the scale for immediately closing said circuit and illuminating the chart lamp as soon as the said scale member and said indicating elements have moved into the range of weighing positions for the indication of computation values.

7. The combination with a weighing scale, of an illuminating lamp, means for causing the lighting of said lamp, said means being automatically controlled by one of the movable members of the scale to cause lighting at a point of displacement of the movable member from normal position; and maintain the lighting during the continued range of displacement of said member; and means for adjusting the point of displacement at which the lighting is effected.

8. The combination with a weighing scale, of an electric illuminating lamp therefor, and a circuit for said lamp including a make and break contact device; connections with the movable parts of the scale for holding the contact device out of circuit making position when the said movable parts are in normal position, and effecting contact making when said parts are displaced from normal position; and means for varying the relation between said contact device and said connections whereby to vary the point of displacement of said movable parts at which lighting contact is made or broken.

9. The combination with a weighing scale, of an electric illuminating lamp therefor, and a circuit for said lamp; a contact making device in said circuit constructed with provision for normally tending to make contact, and a connection between a movable element of said scale and said contact device constructed to hold the contact device out of normal contact making position when the said movable scale element is in normal position, but allowing the contact device to assume normal contact-making position when said movable element is displaced from the normal position, and permitting continued movement of said scale element independent of the contact device.

10. The combination with a weighing scale embodying a movable element actuated upon the weighing movement of the scale, of an electric illuminating lamp for the scale, and a circuit for said lamp; a contact making device in said circuit constructed to normally tend to assume contact making position independently of said movable element; and connections with said movable element for opposing the normal action of the contact device and holding the same out of contact-making position when the said scale element is in normal position but permitting it to assume normal contact-making position when the scale element is displaced from normal position.

11. The combination with a weighing scale embodying a lever connected with the scale platform and movable therewith, of an electric lamp, and a circuit for said lamp; a switch in said circuit including a movable contact in proximity to its opposite contact and constructed to tend to assume contact making position; and connections between said lever and said movable contact to hold the latter away from its opposite contact when said lever is in normal position.

12. The combination with a weighing scale embodying a lever connected with the scale platform and movable therewith, of an electric lamp, and a circuit for said lamp; a switch in said circuit including a movable contact in proximity to its opposite contact and constructed to tend to assume contact making position; connections between said lever and said movable contact to hold the latter away from its opposite contact when said lever is in normal position, and an adjusting screw for changing the position of the said opposite contact and thereby cause said lever to control the movable contact over a greater or less extent of the lever movement.

In testimony whereof we affix our signatures in presence of two witnesses.

HARRY H. BANE.
SAMUEL G. CRANE.

Witnesses:
HAROLD E. RICHARDS,
E. E. CARPENTER.